April 4, 1961 E. J. BENDER ET AL 2,977,924
DEVICE FOR ACCURATELY PLACING LANES OF GRANULES ON MOVING WEB
Filed March 16, 1954 3 Sheets-Sheet 1

INVENTORS:
EDWARD J. BENDER
HOWARD E. RICHARDSON
BY
ATTORNEY

INVENTORS
EDWARD J. BENDER
HOWARD E. RICHARDSON
BY
ATTORNEY

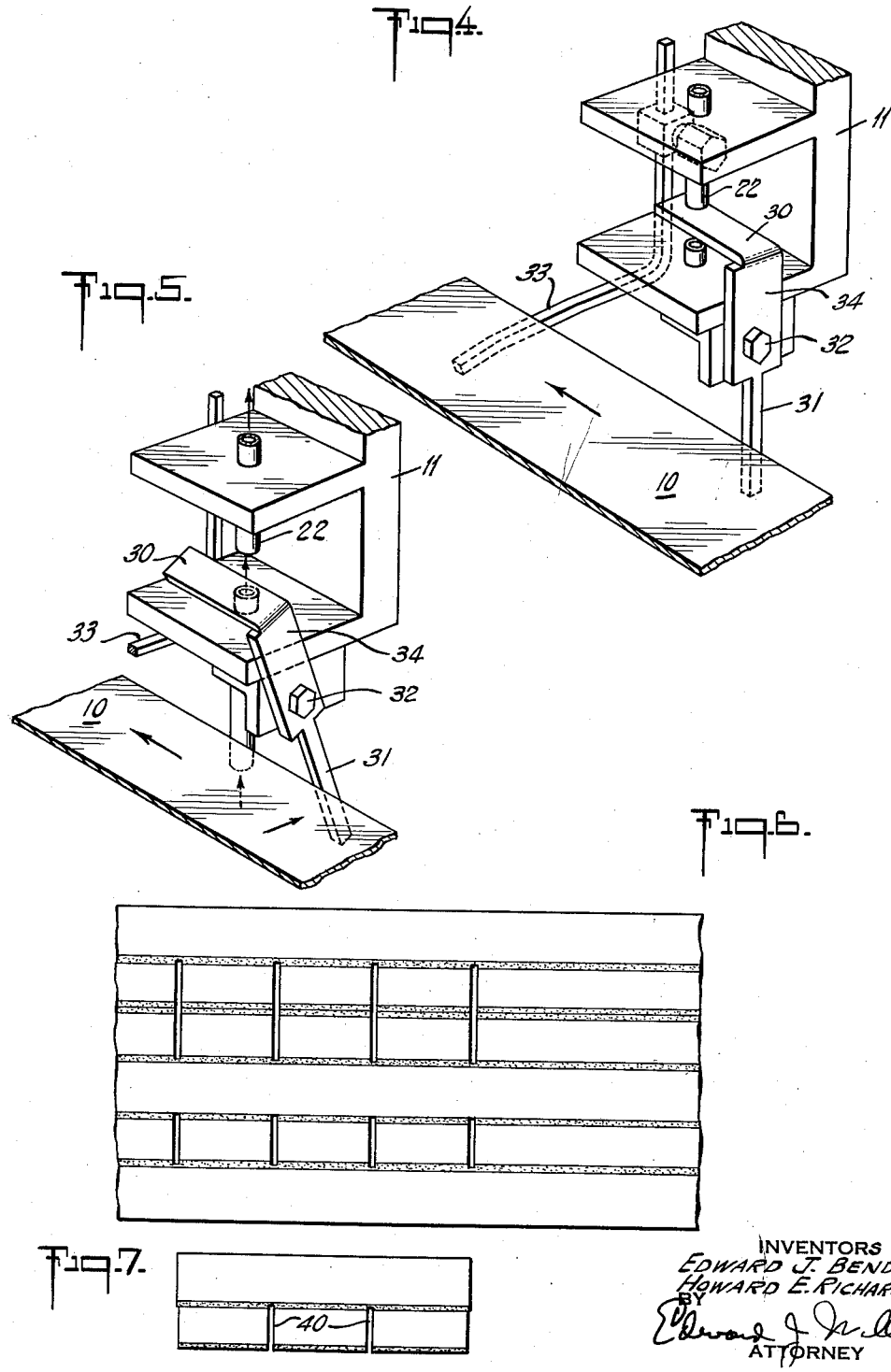

ent Office 2,977,924
Patented Apr. 4, 1961

2,977,924
DEVICE FOR ACCURATELY PLACING LANES OF GRANULES ON MOVING WEB

Edward J. Bender and Howard H. Richardson, Chicago Heights, Ill., assignors to The Patent and Licensing Corporation, New York, N.Y., a corporation of Massachusetts Filed Mar. 16, 1954, Ser. No. 416,466

2 Claims. (Cl. 118—8)

The present invention relates to an apparatus for manufacturing roofing and more particularly to an apparatus for accurately placing roofing granules in lanes on a moving sheet of roofing material.

Roofing materials and particularly the material known as asphalt shingles, are customarily made by a process involving the use of a continuous sheet of a roofing felt, which is usually saturated with asphalt, covered on one side with plastic asphalt which is in turn covered with a layer of roofing granules. The continuous sheet, after rolling, cooling and drying, is then cut into roofing shingles. One of the types of asphalt shingles most commonly used is known as a strip shingle, wherein the continuous sheet is cut into a plurality of strips usually one foot wide and three feet long with the simultaneous cutting of two slots in the strip to form three tabs per strip.

It is sometimes desirable to place granules longitudinally of the moving sheet of roofing material in lanes. For example, if a "shadow line" or dark band of granules is desired to be placed across a shingle such that the butt edges of the shingle above will appear to have thickness sufficient to cast a shadow, it is necessary to place dark granules in narrow lanes on the roofing material. In addition it may sometimes be desirable to have lighter granules along the butt edge of the shingle in order to thus accentuate the shadow effect. One of the problems in applying these granules is that on the roofing machine the sheet of roofing felt usually weaves from side to side in passing through the machine so that granules dropped in a customary manner from stationary drops may form a weave line throughout the sheet and the shingles subsequently cut therefrom do not match.

It is the principal object of this invention to provide apparatus for applying granules to a moving sheet of roofing material in straight lines on the roofing material.

The invention may be more fully understood by reference to the drawings, but it will be understood that variations and substitutions may be made within the scope of the claims. In the drawings:

Fig. 4 is a detailed view of the control device.

Fig. 5 is a detailed view of the control device in a position different from the one in Fig. 4.

Fig. 6 is a diagrammatic sketch of a section of the roofing sheet; and,

Fig. 7 illustrates a single shingle cut from the roofing sheet shown in Fig. 6.

Figure 1:
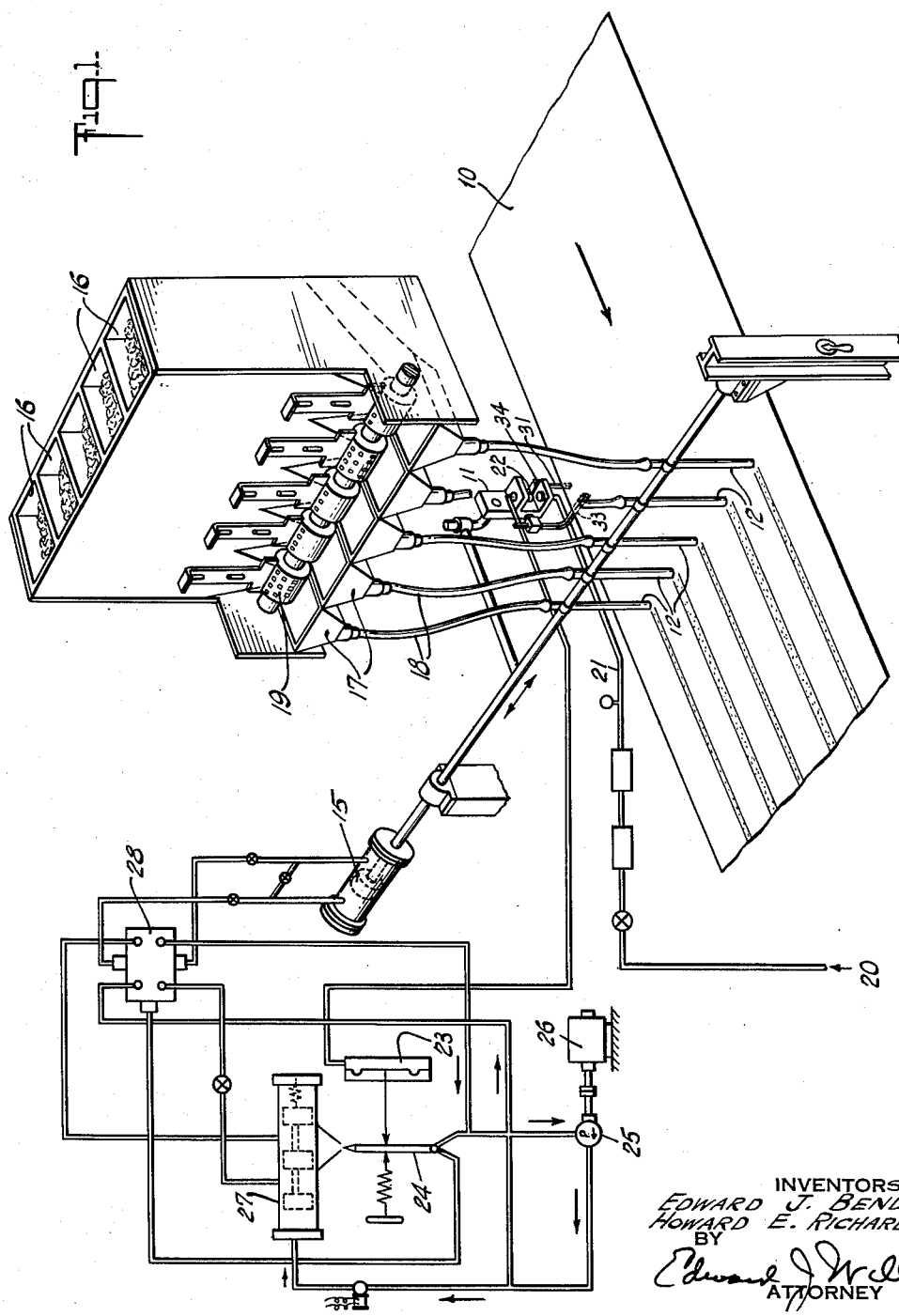
Fig. 1 is a perspective view partly diagrammatic of the control and granule supply means.

With reference to Fig. 1, there is shown the continuous sheet of plastic coated roofing material 10 travelling in the direction indicated by the arrow. The sheet first passes the control device indicated generally by the numeral 11 and passes under a plurality of granule drops 12. The granule drops 12 are clamped or otherwise held to a rod 14 adapted to be reciprocated as by means of piston 15, the movement of which is controlled by regulator 11 as will be described. The granules to be applied are stored in a plurality of hoppers 16 from which the granules are fed into funnels 17 through flexible tubes 18 to the granule drops 12 by means of rotary cylinders 19 containing cup shaped depressions which are adapted to keep granules flowing freely from the hoppers above.

It will be understood that the sheet is moved and supported by passing over rotating rollers both before and after the granule drops shown herein. It will also be understood that hoppers 16 and rod 14 are held in the relative positions shown by any suitable supports. The granule drop of the present invention is only one step in the continuous production of roofing material. Roll roofing material, usually paper felt, is put in at one end of the machine and the sheet passed through molten asphalt of low viscosity which impregnates the felt. Next, the felt is coated on one side with a viscous plastic asphalt adapted to hold granules. The present granule drop is preferably the next step. After these lines of granules are applied, the entire sheet is covered by one or more colors of granules as by means of a Norwood Blender (U.S. Patents Nos. 1,574,835; 1,774,988; 1,794,- 719 and 1,857,463). The granules are then roll pressed onto the sheet and excess granules removed. In this manner, the granule drop of this invention, being applied first, is not covered in the final product by granules which may later cover these lanes as those from the Norwood Blender may do.

Regulator 11, except for improvements hereinafter described, is a device obtainable on the market and known as an Askania Regulator. A supply of compressed air 20 is introduced into the system and passes through tube 21 into tube 22 across an opening which may or may not be blocked fully or partly. Any air passing across the gap goes to diaphragm 23. The movement of the diaphragm causes the movement of jet pipe 24 which is supplied with a pressurized circulating fluid such as oil, by means of pump 25 operated by motor 26. The fluid enters cylinder 27 wherein the fluid may be re-distributed by movable obstructions from which the fluid flows to valve relay 28 which in turn controls piston 15 such that the movement of the sheet 10 is detected by regulator 11 and causes the rod 14 with the attached granule drops 12 to follow the movement of the sheet.

The improvement over the standard Askania Regulator is illustrated in greater detail in Figs. 4 and 5. In the standard Askania Regulator, the sheet itself is adapted to pass between the gap between pipes 21 and 22, but with the sheet containing asphalt or the like the pipes become easily clogged and there is utilized instead a strip 30 of metal or the like which is adapted to move into and out of the path of compressed air in respect to the movement of lever 31 which is spring urged against the sheet and pivoted by pivot 32. As shown in Fig. 4, the sheet 10 is at its maximum distance from the regulator wherein the air supply is completely shut-off, whereas at Fig. 5, the sheet has moved toward the regulator, thus permitting the passage of air between the gap between pipes 21 and 22. There is also provided a scraper bar 33 which is adapted to tend to prevent accumulation of plastic material on the lever 31. With further reference to Figs. 4 and 5, it will be noted that the lever 31 is generally longer than the lever 34. The relative lengths of these levers may be adjusted by moving the whole regulator away from or toward the web. This lever system, in addition to providing the advantage of preventing plastic material from getting into the air vents, also has the advantage of giving the regulator greater flexibility. In other words, the range of flexibility of the regulator prior to the adoption of the present lever was approximately the diameter of the air vents 21 and 22. By the use of the lever system, this range can be multiplied several times. This is particularly important in the present application where the function of the regulator is not to keep the travelling web from moving from side to side, but rather following the side to side movement of the web with the granule drops. In the usual system, the regulator in its standard form has been utilized involving a pay-off reel which is reciprocated by the reversible motor to cause the travelling web to conform to rather rigid limitations in side to side movement. In the prior art operation of the device, movement of the sheet inwardly toward the regulator is counteracted by the movement of a pay-off reel which forces the sheet away from the regulator until the air vents are only partly covered by the sheet. In the present process, there is no pay-off reel or other means for controlling the side to side movement of the web, but rather, the web is followed by the granule drop and thus a greater latitude of movement is required and is provided by the lever system.

Figure 2:
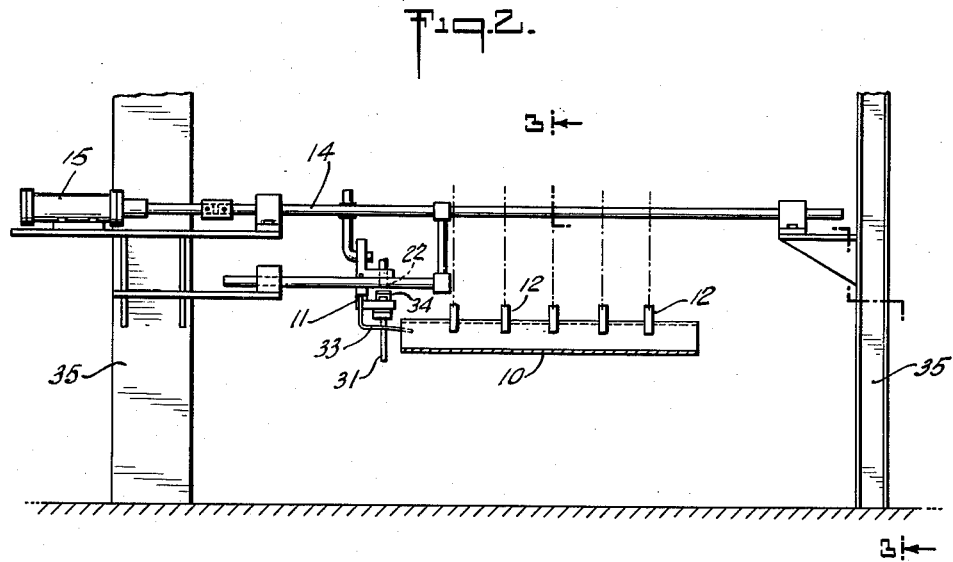
Fig. 2 is a frontal view of the granule dropping device shown in Fig. 1.
Figure 3:
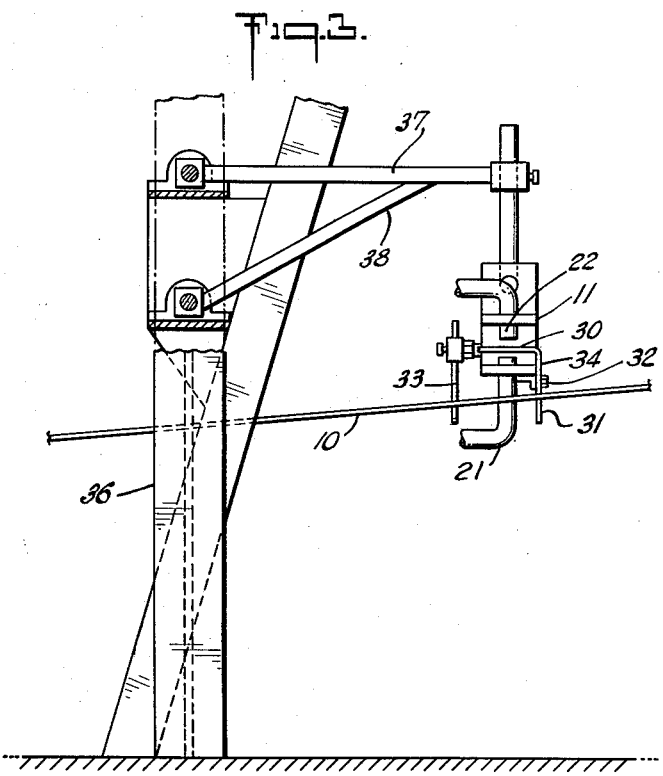
Fig. 3 is a sectional view illustrating the control device shown in Fig. 1.

Figs. 2 and 3 illustrate the supports 35 adapted to hold reciprocating rod 14 in position between the moving sheet 10. A support 36 having arms 37 and 38 is adapted to hold the regulator 11 in adjustable relationship to the edge of sheet 10.

Figs. 6 and 7 show a product in the manufacture of which the device and process are particularly suitable. As will be seen, the drops 12 are adapted to accurately place, for example, three lanes of dark slate and two lanes of light slate to continually produce three shingles side by side which, when cut, will contain slots 40 defining tabs of the shingle. The lanes produce a dark area across the top of the slots and a light area in the tab end of the shingle such that when the shingles are properly laid, the dark area is immediately below a light area of the shingle above, simulating a shadow line.

The present device and process make it possible to continually and accurately place granule lines of any particular color longitudinally of a moving web, even at high machine speeds. This has the advantage of producing an attractive product which is uniform in quality at an economical speed.

We claim:

1. A device for accurately placing lanes of granules on a moving continuous web comprising granule drops attached to a rod, a reversible hydraulic motor attached to said rod and adapted to reciprocate said rod across the direction of travel of said web, and a web following device located near said rod and adapted to actuate said motor in conformity to the side to side movement of said web, said web following device containing a lever, one end of which is adapted to be urged against the edge of the moving web and the other end of which is adapted to move between air jets which in turn actuate said motor, said lever having a pivot between said ends.

2. In a device for following the side to side movement of a continuous moving web by means of a reversible motor actuated by the interruption to the passage of air between two orifices in a web following device, the improvement which comprises a lever having a first end adapted to move into and out of the path of said orifices and a second end adapted to be urged against the edge of said web and to follow the side to side movement of said web and a pivot between said ends, said first end being shorter than said second end.

References Cited in the file of this patent
UNITED STATES PATENTS

| | | |
|---|---|---|
| 834,588 | Odenkirchen et al. | Oct. 30, 1906 |
| 1,192,601 | Boismenue et al. | July 25, 1916 |
| 1,581,322 | Reed | Apr. 20, 1926 |
| 2,037,788 | Hultberg | Apr. 21, 1936 |
| 2,133,473 | Penley | Oct. 18, 1938 |
| 2,218,811 | Chaussabel | Oct. 22, 1940 |
| 2,294,472 | MacKenzie | Sept. 1, 1942 |
| 2,428,284 | Krogel | Sept. 30, 1947 |
| 2,438,787 | Nicholas | Mar. 30, 1948 |
| 2,439,157 | Chavannes | Apr. 6, 1948 |
| 2,510,313 | Houth et al. | June 6, 1950 |
| 2,551,329 | Klemola | May 1, 1951 |
| 2,641,416 | McCleary et al. | June 9, 1953 |
| 2,672,121 | Peeps | Mar. 16, 1954 |